United States Patent [19]
Chevalier et al.

[11] 3,976,878
[45] Aug. 24, 1976

[54] NATURAL GAMMA RAY SPECTRUM ANALYSIS TECHNIQUE

[75] Inventors: Philippe Chevalier, Verrieres Le Buisson, France; Bronislav Seeman, Ridgefield, Conn.

[73] Assignee: Schlumberger Technology Corporation, New York, N.Y.

[22] Filed: Sept. 27, 1974

[21] Appl. No.: 510,103

[30] Foreign Application Priority Data
Oct. 1, 1973    France .............................. 73.35064

[52] U.S. Cl. .............................. 250/253; 250/262; 250/363 R
[51] Int. Cl.² .......................................... G01V 5/00
[58] Field of Search ...................... 250/253, 262, 363

[56] References Cited
UNITED STATES PATENTS

| | | | |
|---|---|---|---|
| 2,850,642 | 9/1958 | Seevers | 250/262 |
| 2,897,368 | 7/1959 | Lundberg et al. | 250/253 |
| 3,105,149 | 9/1963 | Guitton et al. | 250/253 |
| 3,560,744 | 2/1971 | Jordan | 250/366 |
| 3,825,751 | 7/1974 | Johnson | 250/253 |

*Primary Examiner*—Harold A. Dixon

[57]    ABSTRACT

In accordance with an illustrative embodiment of the present invention, a method and apparatus is disclosed for determining the presence of a selected number of naturally radioactive materials in an earth formation from the spectrum of natural gamma radiation emitted by the materials in the formation by deriving representations of portions of the detected gamma radiation spectrum and combining the representations to determine therefrom the presence of the selected materials.

24 Claims, 3 Drawing Figures

NATURAL GAMMA RAY SPECTRUM ANALYSIS TECHNIQUE

BACKGROUND OF THE INVENTION

1. Field of the Invention

The present invention is concerned with detecting and identifying naturally radioactive materials present in an earth formation of interest and, more particularly, a method and apparatus for analyzing a detected spectrum of naturally emitted gamma radiation to determine the presence of a selected number of naturally radioactive materials.

2. Description of the Prior Art

The potential usefulness of being able to measure individually the contributions of the primary sources of natural radiation has been recognized for many years. Such information can, to cite a few instances, be useful in well-to-well correlation, in the study and evaluation of sedimentary basins, in the quantitative measurement of radioactive mineral deposits in a formation, and in conjunction with other techniques, such as neutron activation, to obtain in situ elemental analysis.

An early technique for the location of mineral deposits that finds general utility in distinguishing between geological formations and in locating discontinuities in the earth's crust is described in U.S. Pat. No. 2,749,446, issued June 5, 1956 to Herzog. Simply put, Herzog discloses that it is possible to distinguish between geological formations by recording the detected gamma ray spectrum. The recorded spectrum, according to Herzog, may either be an instantaneous record giving frequency and amplitude information or a time averaged value, although the latter format could prevent the observer from distinguishing between formations. Little constituent identification may be accomplished, however, in formations having more than one radioactive material.

In a later form of natural gamma ray well logging, the counting rates of gamma rays detected in three channels or spectra centered on the 1.46 MeV potassium, the 1.76 MeV uranium, and the 2.62 MeV thorium energies are collected to determine the count contributions and thereby the relative presence of the individual materials to the total count rate. The individual channel or spectrum widths were set at ± 10 percent of the energy value for the particular peak.

Such techniques, while an improvement over the prior methods, still tend to have a rather low statistical accuracy and a relatively high systematic error in evaluating the potassium, uranium and thorium contents of the formation. The detected gamma ray spectrum at any single energy includes a contribution from all of the radioactive materials in the formation, and to rely on a single relatively narrow peak for information as to a selected material, results in ignoring a significant amount of the total information available in the detected gamma ray spectrum.

Another reported technique uses detected gamma ray energy bands that are centered about selected energy peaks. Experiments were performed on specially prepared earth and building material samples taken around a location where an overall dose rate had been measured, and a low-energy band/high-energy band method involving two groupings of three energy ranges was used to determine constituent radioactive material contributions. While a further improvement, statistical accuracy is still sacrificed, however, in that portions of the detected gamma ray spectrum containing relevant information are ignored.

SUMMARY OF THE INVENTION

It is, therefore, an object of the present invention to provide a method and apparatus for determining the presence of a selected number of naturally radioactive materials in an earth formation of interest that offers a superior statistical accuracy than the prior art techniques.

It is a further object of the present invention to provide a method and apparatus for easily and conveniently determining the constituent proportions, with improved statistical accuracy, from the spectrum of natural gamma radiation emitted by the materials in the formation.

There is provided, therefore, in accordance with the present invention, a method and apparatus for determining the presence of a selected number of naturally radioactive materials in an earth formation of interest. Their presence is determined from the spectrum of natural gamma radiation emitted by the materials in the formation by deriving representations of portions of the detected gamma radiation spectrum and combining the representations to determine therefrom the presence of the selected materials.

The number of representations derived is equal to a number of substantially contiguous spectra representative of detected, naturally emitted, formation gamma radiation; the number of substantially contiguous spectra being equal to and no more than the number of radioactive materials selected and the range of energy values of each spectrum including at least one energy peak characteristic of one of the selected radioactive materials. Additionally, representations are derived of at least one additional spectrum that includes a range of energy values below the range included within the substantially contiguous spectra.

When the radioactive materials, whose presence in a formation of interest is being determined, are potassium, uranium and thorium, three substantially contiguous spectra may be used and, it may be advantageous to use two additional spectra below the range included within the three substantially contiguous spectra. The additional spectra may or may not be contiguous with each other or with the three substantially contiguous spectra, and the limits of the individual spectra will depend to a large extent on the nature and type of detection device selected and the desirability of minimizing the error producing effects of gain variations in the electronic components used.

A preferred embodiment according to the present invention for logging the natural gamma ray activity in earth formations surrounding a borehole includes a means for detecting the natural gamma rays and classifying the detected rays according to their respective energy ranges, means for transmitting classified signals to the surface and means for computing from the counting rate in each energy range the presence and constituent portions of the radioactive materials in the formation. Advantageously, recording means will be included so that the information may be recorded on a base that can be correlated with the depth of the investigating device as it advances through the borehole.

BRIEF DESCRIPTION OF THE DRAWINGS

Further objects and advantages of the present invention will be apparent and a better understanding of the invention will be gained from a consideration of the following description of the preferred embodiments, taken in conjunction with the appended figures of the drawings, in which.

DESCRIPTION OF THE PREFERRED EMBODIMENTS

Figure 1:
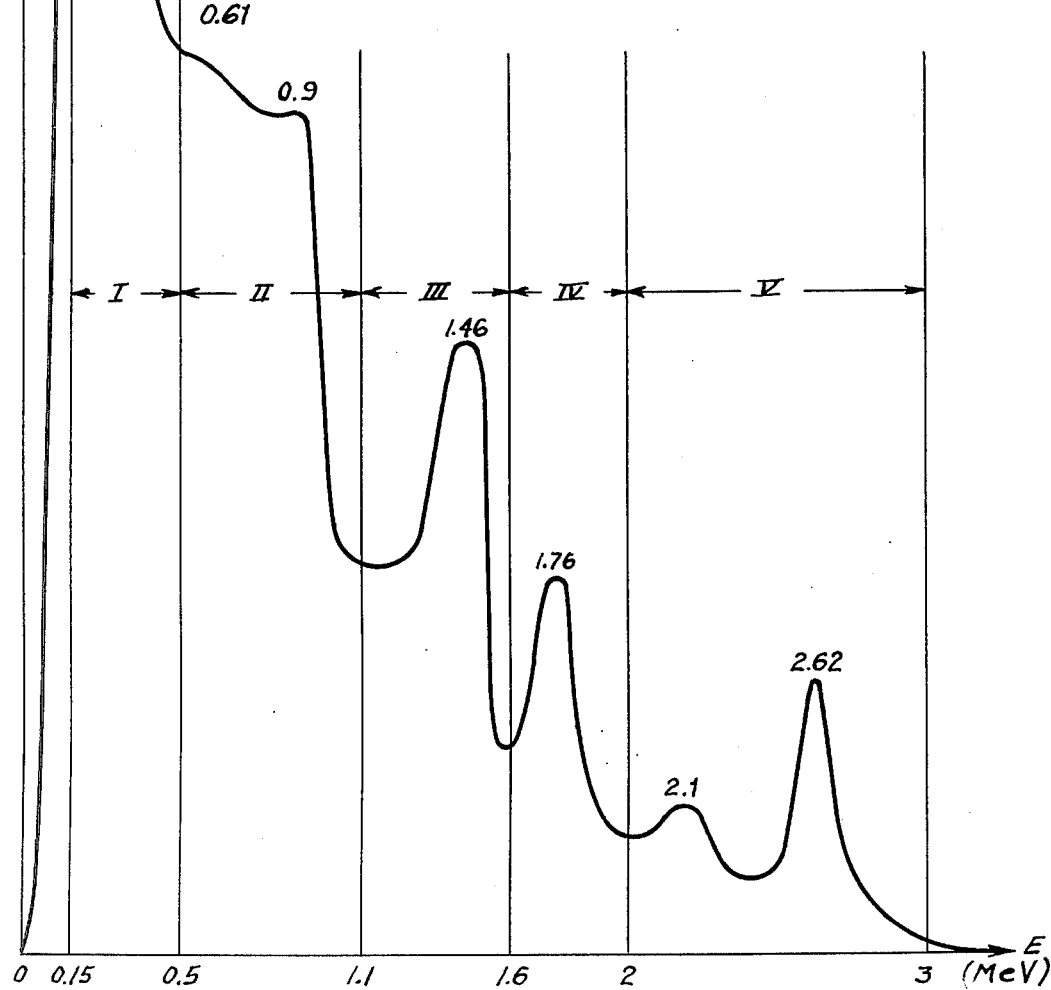
FIG. 1 is a graphical representation illustrating a typical gamma ray spectrum from a naturally radioactive earth formation.

In order to determine the presence and constituent proportions of the radioactive materials in an earth formation in accordance with the method and apparatus of the present invention, a typical natural gamma ray spectrum from a formation of interest is shown in FIG. 1 divided into a number of energy ranges or spectra. That number is dependent, in part, on the number of radioactive materials expected to be present in the formation. Assuming that the formation includes potassium, elements of the uranium family, and elements of the thorium family, it is necessary to include at least one spectrum for each constituent radioactive material that has a significant gamma ray count characteristic of that material.

Remembering that energy levels of significant interest in a typical spectrum from a formation including the above materials will include a 1.46 MeV peak largely determined by the potassium contribution, 0.35, 0.61 and 1.76 MeV peaks representative of the contributions of elements of the uranium family, and 0.25, 0.9, 2.1, and 2.62 MeV peaks representative of the contributions of the elements of the thorium family, the spectrum of FIG. 1 has been divided so that the spectrum or window labeled III includes the 1.46 MeV peak characteristic of potassium, the spectrum or window labeled IV includes the 1.76 MeV uranium peak and the spectrum or window labeled V includes the 2.1 and 2.62 MeV thorium peaks. These three spectra or windows have been made substantially contiguous, in accordance with the present invention, thereby to use all of the detected gamma ray energy counts in the entire natural gamma ray spectrum from a lower limit of about 1.1 MeV to an upper limit of approximately 3 MeV. The reasons for selecting the particular window cutoff values shown in FIG. 1 will be discussed further hereinafter.

The spectra or windows labeled I and II in accordance with the present invention, are selected to include substantially all of the energy values below 1.1 MeV and each include peaks representative of one or more of the materials characterized by an energy peak in windows III, IV or V. There may, however, be circumstances in which one window in the low energy range will be adequate, or conversly, in which more than two windows will give a more reliable answer. Similarly, it may not be necessary that the windows in the low energy range be contiguous or that they include substantially all of the energy values in the low energy range.

In general, for a radioactive material $G_j$, expected to be present in a given formation, it is possible to determine the presence of the particular material $m$ in the formation by examining the following relationship:

$$G_j = \sum_{i=1}^{n} a_{ji} N_{ij}; j=1,2,...,m \qquad 1.$$

where $N$ is the count rate in window $i$ and $a$ is a weighting coefficient derived from the contribution of material $m$ in window $i$.

For the formation assumed above and the window arrangement in accordance with the present invention, as shown in FIG. 1, equations (1) become:

$$K = a_{11}N_1 + a_{12}N_2 + a_{13}N_3 + a_{14}N_4 + a_{15}N_5$$

$$U = a_{21}N_1 + a_{22}N_2 + a_{23}N_3 + a_{24}N_4 + a_{25}N_5 \qquad 2.$$

$$Th = a_{31}N_1 + a_{32}N_2 + a_{33}N_3 + a_{34}N_4 + a_{35}N_5$$

As will be explained hereinafter, the matrix of coefficients $a$ can be predetermined by measuring the count rates $N$ in reference formations containing known amounts of potassium, uranium and thorium and can then be used in a formation of interest with the measured count rates to determine the presence and constituent proportions of the individual materials.

As an alternative, the presence of a particular material can be determined according to the following relationship:

$$N_i = \sum_{j=1}^{m} b_{ij} G_j; i=1,2,...n \qquad 3.$$

where weighted coefficients $b$ are representative of the contribution to the total count in window $i$ of the material $m$.

In the assumed formation and window arrangement of FIG. 1, equations (3) become:

$$N_1 = b_{11} K + b_{12} U + b_{13} Th$$

$$N_2 = b_{21} K + b_{22} U + b_{23} Th$$

$$N_3 = b_{31} K + b_{32} U + b_{33} Th \qquad 4.$$

$$N_4 = b_{41} K + b_{42} U + b_{43} Th$$

$$N_5 = b_{51} K + b_{52} U + b_{53} Th$$

The matrix of coefficients $b$ can be predetermined by a technique similar to that described for the determination of coefficients $a$; i.e., count rate measurements can be taken in reference formations each containing a known amount of one of the individual materials, to determine the coefficient $b$ for each window $n$.

Obviously, the matrix of coefficients $b$ is an inverse matrix of the coefficients $a$, and either matrix may be readily determined once the other is known.

In either method of analysis, however, the solution will depend on the number of counts detected in each of the windows, as expressed by the count rates $N_1$ through $N_5$.

By dividing the gamma ray spectrum into a number of substantially contiguous windows, as shown in FIG. 1, a significant increase is realized in the count rate totals used to determine the presence of the individual radioactive materials in the earth formation. Furthermore, by extending the energy range in which counts are accumulated by providing windows I and II, additional information is made available for a more reliable determination of individual material presence. Thereby, statistical accuracy is greatly improved and a significant decrease in systematic error is realized.

The particular cutoff values that define the windows in accordance with the present invention will depend largely on the particular scintillator crystal used. The size and type of crystal will affect, for example, the form of the detected gamma ray spectrum, and in particular the amplitude of the individual peaks. The particular crystal selected will also affect the values of the individual coefficients $a$ or $b$ that are determined as described above.

When using, for example, a thallium-activated sodium iodide scintillator, it has been found advantageous, as shown in FIG. 1, to select cutoff values to establish windows that include the following five energy ranges: 0.15 to 0.5 MeV, 0.5 to 1.1 MeV, 1.1 to 1.6 MeV, 1.6 to 2 MeV, and 2 to 3 MeV. Using those particular window limitations, it is possible to obtain a superior evaluation of the potassium, uranium and thorium presence and constituent proportions of a formation of interest and to maximize the insensitivity of the apparatus to gain variations.

Gain variation insensitivity is important and is obtained by selecting window cutoff values that are, insofar as possible, at the center of portions of the gamma ray spectrum having a very small slope so that the error introduced by gain drift (resulting in a spectral shift) on the measured spectrum is as small as possible.

Figure 2:
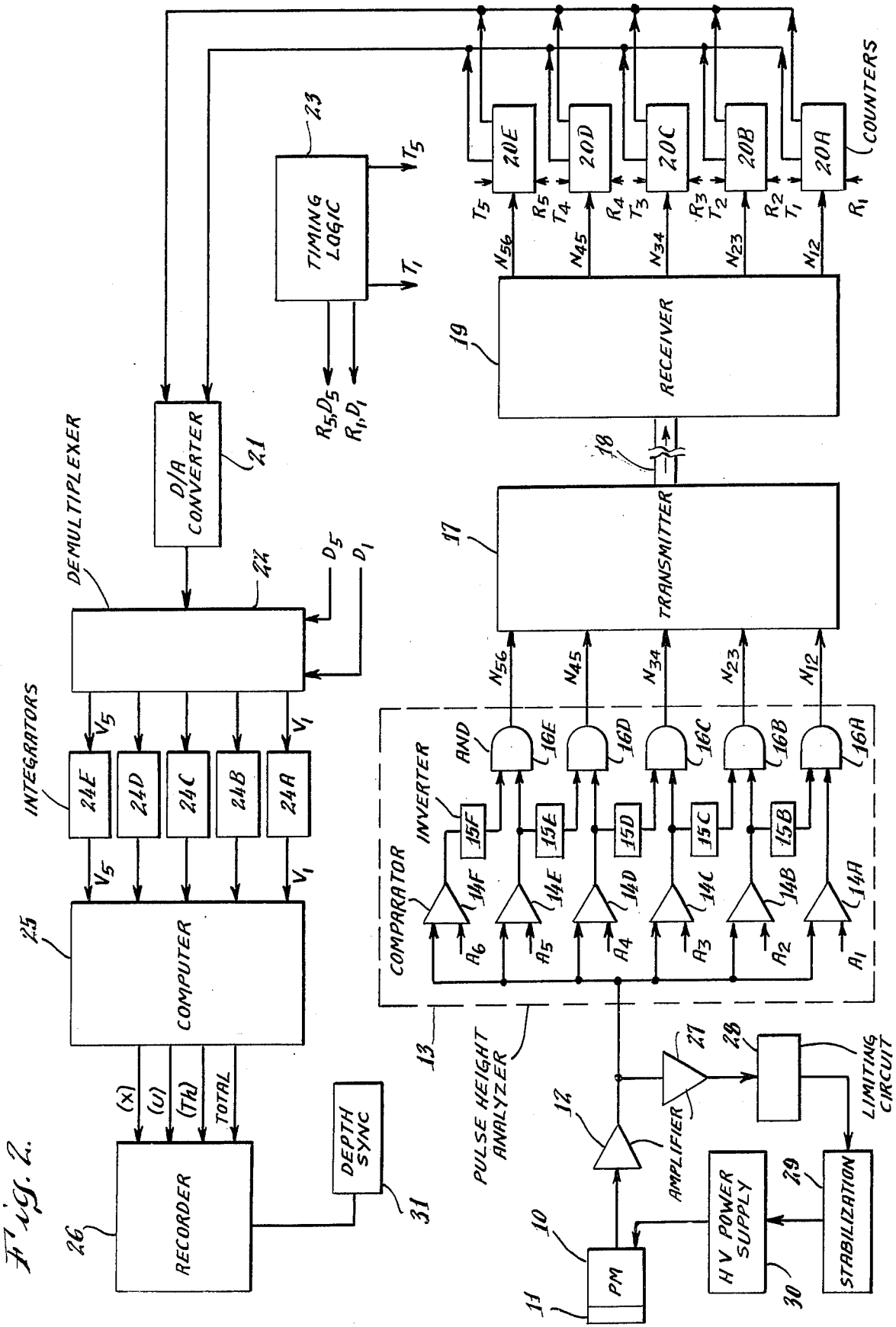
FIG. 2 is a block diagram of an apparatus in accordance with the present invention.

One form of apparatus for carrying out a well logging operation in accordance with the present invention is shown in FIG. 2 and includes a photomultiplier 10 and scintillator crystal 11, which are included within an instrument for investigation of earth formations (not shown).

The instrument will, conventionally, be suspended on a cable and drawn through a borehole, thereby passing through the various earth formations which are to be analyzed by detection of the natural gamma ray spectrum. The output of photomultiplier 10, after amplification by amplifier 12, is applied to multichannel pulse height analyzer 13, which includes six comparators 14A to 14F, five inverters 15B to 15F and five AND gates 16A to 16E. The comparators 14A to 14F have respective reference pulse amplitudes $A_1$ to $A_6$ that define the cutoffs of the windows I through V within which the counting rates of the pulses must be measured. Therefore, the values $A_1-A_2$, $A_2-A_3$, $A_3-A_4$, $A_4-A_5$ and $A_5-A_6$ constitute, respectively, the terminals of the windows I through V.

For a sodium iodide scintillator, the amplitudes $A_1$ through $A_6$ will advantageously correspond, as indicated above, to radiation energies of 0.15, 0.5, 1.1, 1.6, 2 and 3 MeV, respectively.

In operation, when analyzer 13 receives a pulse having an amplitude between, for example, $A_1$ and $A_2$ comparator 14A produces an output pulse and the remaining comparators 14B through 14F are not activated. Since AND gate 16A continues to be enabled by the output of inverter 15B, the pulse from comparator 14A is passed by AND gate 16A and outputted as a pulse contributing to the count rate $N_{12}$. Pulses having amplitudes lower than $A_1$ (which do not activate any of the comparators) and pulses having an amplitude higher than $A_6$ (which activate all the comparators) do not give rise to any analyzer 13 outputs.

Thus, the counting rates $N_{12}$, $N_{13}$, $N_{34}$, $N_{45}$ and $N_{56}$ are representative of the photomultiplier 10 output pulses falling, respectively, within the windows I through V.

The output pulses from analyzer 13, respectively of detected gamma rays in the various windows, are transmitted over conductors 18 by transmitter 17 and received at the surface by receiver 19. Suitable techniques for performing that transmission function are well known, and, therefore, these devices need not be further described.

At the surface, the individual counting rate pulses are inputted to one of five counters 20A through 20E, there being one counter to accumulate the pulses representative of detected gamma rays that fall within each window. The counters 20A through 20E are connected in parallel to a digital-to-analog converter 21, and their transfer and reset functions are controlled by a master timing logic controller 23, which will be further explained hereinafter.

In turn, converter 21 receives a signal representative of the state of the counters 20A–20E and outputs to the multiplexer 22, which is also controlled by controller 23, a voltage that is representative of the state of the individual counters. The multiplexer 22 applies voltage $v_1-v_5$ to integrators 24A through 24E so that voltages $v_1$ through $v_5$ correspond to the counts accumulated to counters 20A through 20E respectively.

Figure 3:
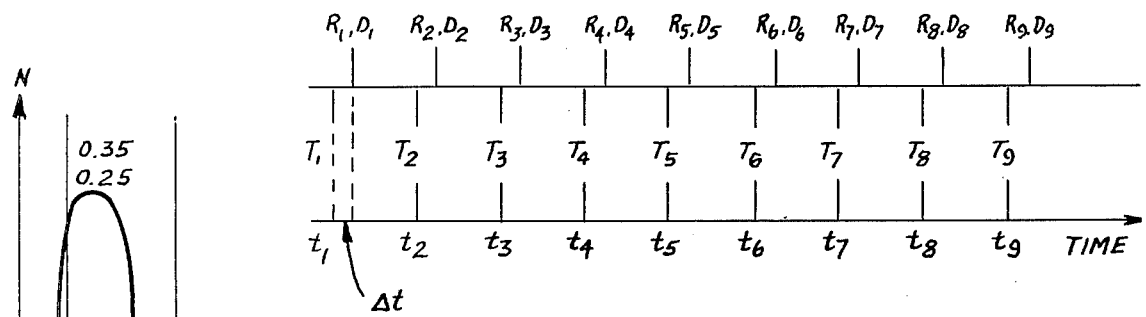
FIG. 3 is a timing sequence diagram for use in explaining the operation of the apparatus of FIG. 2.

To explain the operation of controller 23, reference is made to the timing diagram of FIG. 3, in which $t_1$ represents the time at which the cycle begins. At $t_1$, controller 23 produces a pulse $T_1$ to transfer the state of counter 20A to converter 21 which, almost simultaneously, applies to the multiplexer 22 the voltage $v_1$ representative of that state. At $t_1 + \Delta t$, controller 23 produces a pulse $R_1$ which resets counter 20A and also produces a pulse $D_1$ which routes voltage $v_1$ from the input of the multiplexer 22 to the proper output to be applied to integrator 24A. The cycle continues until the instant $t_6$, at which point a new cycle begins and a signal representative of the state of counter 20A is again applied to converter 21. The process is repeated throughout the investigation of the borehole so that the five voltages $v_1$ through $v_5$ reflect the quantity of pulses delivered by the photomultiplier in each of the selected windows as the instrument is advanced through the borehole. Advantageously, the duration of a cycle is approximately 1 second giving two successive transfer pulses to a given counter a separation of 0.2 seconds.

Integrators 24A through 24E integrate the voltages $v_1$ through $v_5$, preferably over a 4 second period, to produce outputs $V_1$ through $V_5$ which represent counting rates $N_{12}$ through $N_{56}$ of the detected gamma radiation falling within windows I through V respectively. Voltages $V_1$ through $V_5$ may then be applied to analog computer 25 for calculation of the potassium, uranium and thorium pressence and constituent proportions according to the relationships discussed above. Computer 25 need not be at the borehole for computation in accordance with the present invention; alternatively voltages $V_1$ through $V_5$ could be recorded at the borehole site on a magnetic tape recorder or other suitable device for processing at a remote location.

In determining the constituent proportions of the respective radioactive materials, the following equations will be solved:

$$K = a_{11}V_1 + a_{12}V_2 + a_{13}V_3 + a_{14}V_4 + a_{15}V_5$$

$$U = a_{21}V_1 + a_{22}V_2 + a_{23}V_3 + a_{24}V_4 + a_{25}V_5 \quad\quad 5.$$

$$Th = a_{31}V_1 + a_{32}V_2 + a_{33}V_3 + a_{34}V_4 + a_{35}V_5$$

Coefficient $a$, which depend to a large extent on the characteristics of the particular radiation detector used, are determined during a calibration operation of the apparatus from a measurement of the values $V_1$ through $V_5$ in reference formations having known potassium, uranium and thorium contents. Accurate calibration permits, therefore, computation of the constituent proportions or amounts of the individual materials in the formation.

More precisely, the matrix of coefficients $b$, which is the inverse of that of coefficients $a$, is determined according to the following five relationships, which express the counting rates in the five windows in accordance with the values of potassium, uranium and thorium:

$$V_1 = b_{11} K + b_{12} U + b_{13} Th$$

$$V_2 = b_{21} K + b_{22} U + b_{23} Th$$

$$V_3 = b_{31} K + b_{32} U + b_{33} Th \quad\quad 6.$$

$$V_4 = b_{41} K + b_{42} U + b_{43} Th$$

$$V_5 = b_{51} K + b_{52} U + b_{53} Th$$

When the particular radiation detector to be used is placed in a radioactive medium simulating a formation and containing only a known quantity of potassium $K_0$, the coefficients $b_{11}$ through $b_{51}$ are given by the ratios $V_1/K_0$ through $V_5/K_0$, respectively. In the same manner coefficients $b_{12}$ through $b_{52}$ and $b_{13}$ through $b_{53}$ are determined by using formation simulating mediums containing only known quantities of uranium and thorium, respectively. The matrix of coefficients $a$ is then obtained by simple inversion of the matrix of the coefficients $b$.

Computer 25 produces three voltages, representative of the three calculated contents, that are recorded by recorder 26. Recorder 26 will, conventionally, be depth synchronized by a pulse or other means from depth sync 31 as the instrument is moved through the borehole. As the instrument advances through the borehole, therefore, apparatus according to the present invention generates three curves representing variations in the major potassium, uranium and thorium contents of the earth formations as a function of the distance below the surface of the earth.

Other outputs from computer 25 are possible, and advantageously a forth voltage will be produced which will represent the sum of the voltages $V_1$ through $V_5$ and will correspond to the total gamma radioactivity of the formation and will also be recorded by recorder 26.

Alternatively, the potassium, uranium and thorium contents may be calculated directly from counting rates $N_i$ measured in the different windows and can be performed by using a spectrum-stripping or other technique to determine the values of potassium, uranium and thorium which best satisfy the following relationship for the number of counting rates, $n$ obtained:

$$N_i = b_{i1} K + b_{i2} U + b_{i3} Th$$

In other words, the values $V_1$ to $V_5$ are sought on the basis of elementary values corresponding to known potassium, uranium and thorium contents. The remainder of this reconstitution can then be regarded as an evaluation of the quality of the method, which constitutes a significant advantage of the method.

As indicated above, insensitivity to gain variations is important and the quality of the results obtained in accordance with the present invention will depend upon the stability of the gain of photomultiplier 10. It will be advantageous, therefore, to use a stabilization technique such as that described in U.S. Pat. No. 3,922,541 issued to B. Seeman on Nov. 25, 1975. Since, however, the gamma ray spectrum of interest in the present invention extends up to 3 MeV, it is necessary, in contrast to the technique disclosed in that application, to use a source having an energy lower than 150 KeV. That energy level is the limit below which gamma rays from the formation do not reach the detector due to the metallic jacket in the instrument that is necessary to insure protection of the scintillator crystal and that constitutes a screen preventing detection of particles having energies lower than that value. One such source is americium 241 that has a gamma emission peak suitable for reference purposes at 60 KeV, thereby leaving the natural gamma ray spectrum of the formation undisturbed.

Referring to FIG. 2, a photomultiplier gain system is shown in which the output pulses from amplifier 12 are applied to a second amplifier 27 and limiting circuit 28, which is adjusted to allow passage of pulses corresponding only to detected gamma rays having an energy value lower than 150 KeV. The output from circuit 28 is applied to stabilization system 29 and is used for noting the movements of the 60 KeV peak corresponding to variations in photomultiplier gain. System 29 produces an error signal having an amplitude and sign that are representative, respectively, of the extent and direction of the gain shift. The error signal is used to control the level of the high voltage applied to photomultiplier 10 by the high voltage power supply 30. Thereby, the photomultiplier is rapidly corrected for gain variations which would adversely affect the quality of the results obtained by the apparatus of the present invention.

Although the invention has been described with reference to specific embodiments thereof, many other variations and modifications of the invention will be apparent to those skilled in the art without departing from the spirit and scope of the invention. For example, the specific energy band cutoff values could be modified if a scintillator of another type or another form were used such as a solid lithium/compensated germanium or cadmium-telluride detector. Furthermore, processing of the data sent to the surface by the investigation instrument to receiver 19 is not limited to an analog computer but could also be accomplished by the use of a digital computer. The above described embodiments are, therefore, intended to be merely exemplary and all such variations and modifications are intended to be included within the scope of the invention as defined in the appended claims.

We claim:

1. A method for determining the presence of a selected number of naturally radioactive materials in an earth formation of interest from the spectrum of natural gamma radiation emitted by the materials in the formation comprising:

deriving (1) from a number of substantially contiguous spectra representative of detected, naturally emitted, formation gamma radiation an equal number of representations thereof, the number of substantially contiguous spectra being equal to and no more than the number of radioactive materials selected and the range of energy values of each spectrum including at least one energy peak characteristic of at least one of the selected radioactive materials and (2) representations of at least one additional spectrum that includes at least one energy peak characteristic of at least one of the selected radioactive materials, that is defined by a range of energy values entirely below the range included within the substantially contiguous spectra, and has energy range limits generally located in portions of the detected gamma radiation spectrum having a low slope; and combining the representations to compute the presence of the selected materials from the substantially contiguous spectra and at least one additional spectrum.

2. A method according to claim 1, wherein said deriving step includes deriving representations of two additional spectra.

3. A method according to claim 2, wherein the materials being determined include potassium, uranium and thorium.

4. A method according to claim 3, wherein the substantially contiguous spectra include the energy ranges 1.1 to 1.6 MeV, 1.6 to 2 MeV and 2 to 3 MeV and the two additional spectra include the energy ranges 0.15 to 0.5 MeV and 0.5 to 1.1 MeV.

5. A method for determining the presence of a selected number of naturally radioactive materials in an earth formation of interest from the spectrum of natural gamma radiation emitted by the materials in the formation comprising:

detecting gamma radiation emitted by the formation to produce output pulses representative thereof;

measuring the counting rates of the pulses having amplitudes falling within three substantially contiguous gamma ray energy windows containing, respectively, peaks corresponding to the energies 1.46, 1.76 and 2.62 MeV;

measuring the counting rate within at least one additional window that includes at least one energy peak characteristic of at least one of the selected radioactive materials, that is defined by a range of energy values entirely below the range included within the three substantially contiguous windows, and has energy range limits generally located in portions of the detected gamma radiation spectrum having a low slope; and computing the presence of the selected materials from all the measured counting rates.

6. A method according to claim 5, wherein the limits of the substantially contiguous windows are generally chosen in portions of the detected gamma ray spectrum having a low slope.

7. A method according to claim 5, wherein the total number of windows is five.

8. A method according to claim 7, wherein the five windows include the energy ranges: 0.15–0.5 MeV, 0.5–1.1 MeV, 1.1–1.6 MeV, 1.6–2 MeV, and 2–3 MeV.

9. A method according to claim 5, wherein the selected materials are potassium, uranium and thorium and their presence is computed, from the measured counting rates, by solving the following relationships:

$$G_j = \sum_{i=1}^{n} a_{ji} N_i; j=1,2,...,m$$

wherein G is the particular material, $n$ is the number of windows, N is the counting rate in each window and coefficients $a$ are weighting coefficients derived from the contributions of the respective materials to counting rate N in window $i$.

10. A method according to claim 5, wherein the selected materials are potassium, uranium and thorium and their presence is computed by determining the value of potassium, uranium and thorium which best satisfies, for all counting rates, the following relationships:

$$N_i = b_{i1} K + b_{i2} U + b_{i3} Th\;;\; i = 1, 2, \ldots, n$$

wherein $n$ is the number of windows, coefficients $b$ are weighting coefficients giving the contributions of the respective materials to counting rate N in window $i$.

11. Apparatus for determining the presence of a selected number of naturally radioactive materials in an earth formation of interest from the spectrum of natural gamma radiation emitted by the materials in the formation comprising:

means for deriving (1) from a number of substantially contiguous spectra representative of detected, naturally emitted, formation gamma radiation an equal number of representations thereof, said number of substantially contiguous spectra being equal to and no more than said number of radioactive materials selected and each spectrum energy value range including at least one energy peak characteristic of one of said selected radioactive materials and (2) representations of at least one additional spectrum that includes at least one energy peak characteristic of at least one of the selected radioactive materials, that is defined by a range of energy values entirely below said substantially contiguous spectra, and has energy range limits generally located in portions of the detected gamma radiation spectrum having a low slope; and means for combining said representations to compute the presence of said selected materials from said substantially contiguous spectra and at least one additional spectrum.

12. Apparatus according to claim 11, wherein representations of two additional spectra are derived.

13. Apparatus according to claim 12, wherein said selected materials include potassium, uranium and thorium.

14. Apparatus according to claim 13, wherein said substantially contiguous spectra include the energy ranges 1.1 to 1.6 MeV, 1.6 to 2 MeV and 2 to 3 MeV and said two additional spectra include the energy ranges 0.15 to 0.5 MeV and 0.5 to 1.1 MeV.

15. Apparatus for determining the presence of a selected number of naturally radioactive materials in an earth formation of interest from the spectrum of natural gamma radiation emitted by the materials in the formation comprising:

means for detecting gamma radiation emitted by said formation to produce output pulses representative thereof;

means for measuring three counting rates for said pulses having amplitudes falling within three substantially contiguous gamma ray energy windows containing, respectively, peaks corresponding to the energies 1.46, 1.76 and 2.62 MeV;

means for measuring a counting rate within at least one additional window that includes at least one energy peak characteristic of at least one of the selected radioactive materials, that is defined by a range of energy values entirely below the range included in said three substantially contiguous windows, and has energy range limits generally located in portions of the detected gamma radiation spectrum having a low slope; and computing the presence of said selected materials from all said measured counting rates.

16. Apparatus according to claim 15, wherein the limits of said windows are generally chosen in portions of the detected gamma ray spectrum having a low slope.

17. Apparatus according to claim 15, wherein the total number of windows is five.

18. Apparatus according to claim 17, wherein said five windows include the energy ranges: 0.15–0.5 MeV, 0.5–1.1 MeV, 1.1–1.6 MeV, 1.6–2 MeV and 2–3 MeV.

19. Apparatus according to claim 15, wherein said selected materials are potassium, uranium and thorium and their presence is computed, from said measured counting rates, by solving the following relationships:

$$G_j = \sum_{i=1}^{n} a_{ji} N_i; j=1,2,\ldots,m$$

wherein G is a particular material, $n$ is the number of windows, N is the counting rate in each window and coefficients $a$ are weighting coefficients derived from the contributions of the respective materials to the counting rate N in window $i$.

20. Apparatus according to claim 15, wherein said selected materials are potassium, uranium and thorium and their presence is computed by determining a value of potassium, uranium and thorium which best satisfies, for all counting rates, the following relationships:

$$N_i = b_{i1} K + b_{i2} U + b_{i3} Th \; : i = 1, 2, \ldots, n$$

where $n$ is the number of windows, coefficients $b$ are weighting coefficients giving the contributions of the respective materials to the counting rate N in window $i$.

21. Apparatus for determining the amount of potassium, elements of the uranium family, and elements of the thorium family in an earth formation comprising:

detector means for producing first pulses representative of gamma radiation emitted by said formation;

means for classifying said first pulses into at least four windows including a range of energy values in said gamma radiation spectrum to produce second, amplitude categorized, pulses, three of said windows being substantially contiguous and containing, respectively, peaks corresponding to the energies 1.46, 1.76 and 2.62 MeV, and the other of said windows being limited to a range of energy values that includes at least one energy peak characteristic of at least one of the selected radioactive materials, that is defined by a range of energy values entirely below the range included within the substantially contiguous spectra, and has energy range limits generally located in portions of the detected gamma radiation spectrum having a low slope;

counter means connected to said classifying means for counting said second pulses according to amplitude categories; and data processing means for combining the amplitude categorized, counted second pulses to produce three output signals representative of the potassium, uranium and thorium contents of said earth formation.

22. Apparatus according to claim 21, wherein said data processing means includes converter means for producing at least four analog signals, each representative of the accumulated count of one of said amplitude categorized, second pulses and said analog signals are combined to produce said three outputs.

23. Apparatus according to claim 21, wherein said data processing means includes further combining means for producing a fourth output signal representative of the total of said three output signals.

24. Apparatus according to claim 21, wherein said detector means includes a gain stabilization system.

* * * * *